United States Patent
Bauer et al.

(10) Patent No.: US 7,519,571 B2
(45) Date of Patent: Apr. 14, 2009

(54) SYSTEM AND METHOD FOR TRANSMITTING DATA VIA DATA NETWORKS WITH DATA CONVERSION BY A COM AUTOMATIC MARSHALLER

(75) Inventors: Thomas Bauer, Stutensee (DE); Roland Heymann, Erlangen (DE); Heinz-Christoph Schmolka, Graben-Neudorf (DE); Marcus Sebald, Erlangen (DE); Thomas Talanis, Heroldsbach (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 538 days.

(21) Appl. No.: 10/343,709

(22) PCT Filed: Jul. 27, 2001

(86) PCT No.: PCT/DE01/02853
§ 371 (c)(1),
(2), (4) Date: Jun. 9, 2003

(87) PCT Pub. No.: WO02/13481
PCT Pub. Date: Feb. 14, 2002

(65) Prior Publication Data
US 2004/0030698 A1    Feb. 12, 2004

(30) Foreign Application Priority Data
Aug. 3, 2000 (DE) ............................. 100 38 562

(51) Int. Cl.
*G06F 17/30* (2006.01)
(52) U.S. Cl. .................... 707/1; 709/223; 709/224
(58) Field of Classification Search ............. 709/227, 709/223–226; 707/1, 10
See application file for complete search history.

(56) References Cited

U.S. PATENT DOCUMENTS 5,583,922 A * 12/1996 Davis et al. ............. 379/93.09
6,151,602 A * 11/2000 Hejlsberg et al. ............ 707/10

(Continued)

OTHER PUBLICATIONS

Spreitzer et al., HTTP Next Generation:, Ninth International World Wide Web Conference, Amsterdam, NL, May 15-19, 2000, Online!vol. 33, Nos. 1-6, pp. 593-607, Computer Networks, Jun. 2000, Elsevier, NL:ISSN: 1389-1286, pp. 593-594, Column 1, Line 41.

(Continued)

*Primary Examiner*—Hung T. Vy
*Assistant Examiner*—Hanh B Thai
(74) *Attorney, Agent, or Firm*—Staas & Halsey LLP

(57) ABSTRACT

A system and a method of transmitting data via data networks. A bi-directional data connection is created even behind firewalls, including from a client not visible to a server in the Internet. In the method and system, a first connection request for establishing a first transmission channel is sent to a server of an automation system from a first data processing device of a client via a data connection. This request is answered by the server via a second transmission channel. The data connection is kept permanently open, thereby allowing mutually time-independent bi-directional sending and receiving of data between the client and the server, via at least one data network. A COM automatic marshaller which incorporates itself into the communications chain between the client and the server is provided.

22 Claims, 4 Drawing Sheets

U.S. PATENT DOCUMENTS

| | | | | |
|---|---|---|---|---|
| 6,178,529 | B1* | 1/2001 | Short et al. | 714/51 |
| 6,202,096 | B1* | 3/2001 | Williams et al. | 709/230 |
| 6,272,675 | B1* | 8/2001 | Schrab et al. | 717/100 |
| 6,401,120 | B1* | 6/2002 | Gamache et al. | 709/226 |
| 6,421,728 | B1* | 7/2002 | Mohammed et al. | 709/227 |
| 6,529,949 | B1* | 3/2003 | Getsin et al. | 709/217 |
| 7,003,558 | B2* | 2/2006 | Agrusa et al. | 709/223 |
| 2002/0023143 | A1* | 2/2002 | Stephenson et al. | 709/218 |

OTHER PUBLICATIONS

Wolf, "Experiences with HTTP-Select and Asynchronous Updates", Internet Draft, Online!, Jun. 1999, pp. 1-11, found in the Internet URL:http://wwl.ics.uci.edu/pub/ietf/http/draft-wolf-http-select-00.txt.

"An Exploration of Dynamic Documents", Netscape Assistance, Online!-1995, pp. 1-6, found in the Internet: URL: http://home.netscape.com/assist/net_sites/pushpull.html am2001-10-311.

Khare, "Building the Perfect Beast: Dreams of a Grand Unified Protocol", IEEE Internet Computing, Mar.-Apr. 1999, IEEE, USA, vol. 3, No. 2, pp. 89-93.

Himstedt et al. "OPC-OLE for Process Control: Ein Standard unter vielen oder eine Revolution für die Automatisierungstechnik?", Elektronik, Franzis Verlag GmbH, Munich, DE, vol. 46, No. 7, Apr. 1, 1997, pp. 56-58, 60.

Cohen et al., "Managing TCP Connections under Persistent HTTP", Proceedings of the Eight International World Wide Web Conference, Toronto, Ont., Canada, May 11-14, 1999, vol. 31, Nos. 11-16, pp. 1709-1723.

* cited by examiner

SYSTEM AND METHOD FOR TRANSMITTING DATA VIA DATA NETWORKS WITH DATA CONVERSION BY A COM AUTOMATIC MARSHALLER

CROSS REFERENCE TO RELATED APPLICATIONS

This application is based on and hereby claims priority to PCT Application No. PCT/DE01/02853 filed on 27 Jul. 2001 and German Application No. 100 38 562.1 filed on 3 Aug. 2000, the contents of which are hereby incorporated by reference.

BACKGROUND OF THE INVENTION

The invention relates to a system and to a method for transmitting data via data networks, especially the Internet, with asynchronous data connection.

With the help of data networks, it is possible to set up a data connection to a server from any computers, so-called clients, which have access to these data networks. This applies particularly to the World Wide Web (WWW), which is also referred to as the Internet. The terms Web or Internet server and Web or Internet client used below serve to clarify the association with the special data network, the Internet, but are not functionally different than the meaning of the terms client or server, which are used for all possible data networks.

On the Internet, a data connection is set up to a so-called Web or Internet server. Access to an Internet server takes place, for example, with the help of known Internet browsers, e.g. Internet Explorer from the company Microsoft or Netscape Communicator from the company Netscape. When setting up a data connection from a so-called Web or Internet client, a so-called request is made to an Internet server by entering and sending off a so-called URL address. When a data connection is established, the Internet server called replies with a so-called HTML page (HTML=Hyper Text Markup Language), also known as a Web page. The so-called Web clients communicate with the Web servers by transport protocols. Each data connection between Web client and Web server is based on a so-called request protocol, and, as a response to this, a so-called response protocol.

SUMMARY OF THE INVENTION

One aspect of the invention is based on the object of specifying a system and a method for transmitting data via data networks, especially the Internet, which enables a time-independent bidirectional transmission of data, especially of any Corn interfaces, between two data processing devices that can be coupled to data networks, especially the Internet, even behind data protection devices, in particular firewalls.

The technical problem to be solved is explained in more detail below: in the world of COM (=Component Object Modeling), callbacks play a central role. The procedure here is that a client allocates a task to a server and, at the same time, provides it with a so-called callback interface. By this callback interface, the server can then asynchronously send back intermediate reports (progress information) or the like or else completion of the task to the clients without the client having to wait for this (or even having to ask for this=polling). (See FIG. 3b). On the Internet, the communication proceeds according to a request response process: a client makes a request, which is replied to with a response. (Comparable with a function call) (see FIG. 3a). Asynchronous callbacks are therefore not possible via the Internet. An arbitrary extension of the HTTP protocol would be detected by established firewalls as a misuse and rejected.

Whenever this problem has occurred, it has until now been necessary to resort to polling, i.e. the client demands new data from the server at regular intervals. With the subject matter, a COM automatic marshaller is created using a "bidirectional HTTP communication", which marshaller is incorporated in the communications chain between client and server (as in DCOM). The automatic marshaller interprets the call to be carried out, transmits the data relevant to the call with the help of the abovementioned communication to the server, which then carries out the actual call. By the communication channel created, callback interfaces (more exactly calls from the server to a callback interface at the client) can also be transmitted transparently (see FIG. 4).

A particular advantage lies in the fact that, due to the connection of the automatic marshaller and the bidirectional HTTP communication, it becomes possible to transfer "any" COM interfaces via the Internet. In the past, it was is only possible to transmit special interfaces with the help of the HTTP communication, but a special proxy and stub code then had to be written for these.

Depending on the specification, the automatic marshaller can only support automation (i.e. derived from IDispatch) or only custom interfaces, or both.

With data transmission via the Internet or with bidirectional HTTP communication, the first thought is to an HTTP transport protocol, but other (Internet) transport protocols such as, for example, FTP are, of course, also conceivable and possible and are likewise part of this application. Checking for valid use of the HTTP protocol on the Internet lies with the firewalls. Explicit reference is made to the fact that a central advantage is the possibility of communicating bidirectionally even beyond firewall limits. In spite of this, intranet naturally also lies within the scope of the proposed solution.

Another aspect of the invention is based on the further knowledge that a genuine "active" data connection to a client that is not visible on the Internet is not possible with the help of the Internet but only a data connection between any client connected to the Internet and any server that is visible on the Internet. This disadvantage is solved in a surprisingly simple manner by a first transmission channel being set up first of all from the client to the Internet server of an automation system. For this purpose, a first connection request is transmitted to the Internet server of the automation system from the client, which, after establishing the bidirectional data connections, can act as a fully functioning control and monitoring system for the automation system. The Internet server replies to this connection request and, in order to hold this data connection permanently open, the Internet server transmits apparent data to the client, for example, even when user data are not available, or transmits information to the client, which informs the client that a transmission of user data is still intended. Here, apparent data are data that are generated by the server itself and are transmitted to the client for the purpose of maintaining the data connection.

By this, a permanently open data connection is installed, via which the Internet server and thus the automation system can asynchronously transmit data to the client, and thus to the C&M system, at any time and independently of actions by the client.

Independently of and in parallel with this, client and Internet server can also communicate with one another in a known manner on the Internet by the client directing a new request to the Internet server in each case, which is replied to by the latter with an appropriate response.

A system of mutually independent data connections is thus available, by which both the client, i.e. the C&M system, and the automation system can communicate with one another on their own instigation. Functionally, a bidirectional data connection is ensured between client and server or, in other words, between control and monitoring system and automation system, which in particular also enables data to be transmitted from the server to the client, as the server is continuously connected to the client by a permanently open transmission channel so that bidirectional data transmission between client and server, which is mutually independent with respect to time, is enabled. A data connection of this kind is particularly suitable for controlling and monitoring an automation system, the client being able to function as a control and monitoring system, which can be activated from any computer that is connected to the Internet. In contrast with known Internet data connections, an asynchronous data transmission process is thus produced, which does not demand of the client the need to be visible on the Internet or to have a so-called Web Server installed (IIS=Internet Information Server). By this, it is possible to set up a bidirectional data connection to a server from any location in the world, in front of and behind data protection devices, in particular firewalls. As the data connection is activated from the client, i.e. from the C&M system, it is not necessary for the server to actively set up a data connection to the client on its own instigation. Furthermore, a change to the configuration of the client is also unnecessary.

Permanent maintenance of a data connection can be ensured by transmitting apparent data in order to maintain at least one transmission channel even when user data are not available.

A particularly advantageous embodiment is characterized in that the apparent data are transmitted from the server to the client. In doing so, it has been shown to be particularly advantageous that, when user data are not available, apparent data are transmitted from the server to the client every 25-35 sec. in order to keep the data connection open.

A further advantageous embodiment is characterized in that, in order to maintain a permanent data connection, in particular a transmission channel between server and client, the server transmits information to the client, which informs the client that a transmission of data is intended.

A further advantageous embodiment is characterized in that, in order to permanently maintain a data connection, in particular a transmission channel between server and client, by which quantities of data up to a defined size are transmitted from the server, a request for a new connection demand is transmitted from the server to the client before the defined quantity of data is reached and, after this, a new request for a connection for setting up at least one new transmission channel is transmitted from the client to the server. A size of 15-25 MB for the quantity of data to be transmitted via a transmission channel has been shown to be very advantageous, as this improves the performance or the response times of the system outstandingly on account of the communication beyond firewall computers and thus the cost/benefit ratio is at its most effective.

A further advantageous embodiment is characterized in that a transport protocol, in particular an Internet transport protocol, is provided for controlling the data transmission. At the same time, the use of the Hypertext Transport Protocol (HTTP) as a transport protocol has been shown to be particularly advantageous, as its use is exceptionally easy and the adaptation effort is very low.

A particularly advantageous application using existing infrastructures, in particular Internet infrastructures, for a bidirectional transmission of data relates to the method for controlling and monitoring an automation system, for example, being provided via at least one data network, in particular via the Internet, as, by this, remote diagnostics, for example, can be implemented very easily, as a result of which the analysis of faults that occur and their rectification in ongoing operation of automation systems, for example, that are spatially far away from one another can be carried out cost effectively.

A further advantageous embodiment is characterized in that the client does not have to be visible on the Internet or does not have to have an Internet Information Server (IIS) installed.

A connection of the automation and communication equipment can be made in a simple manner in such a way that the control and monitoring system of the client initiates the provision of at least one transmission channel as a distributed object, in particular as a DCOM object, and that the connection to the automation system is set up via a DCOM server.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
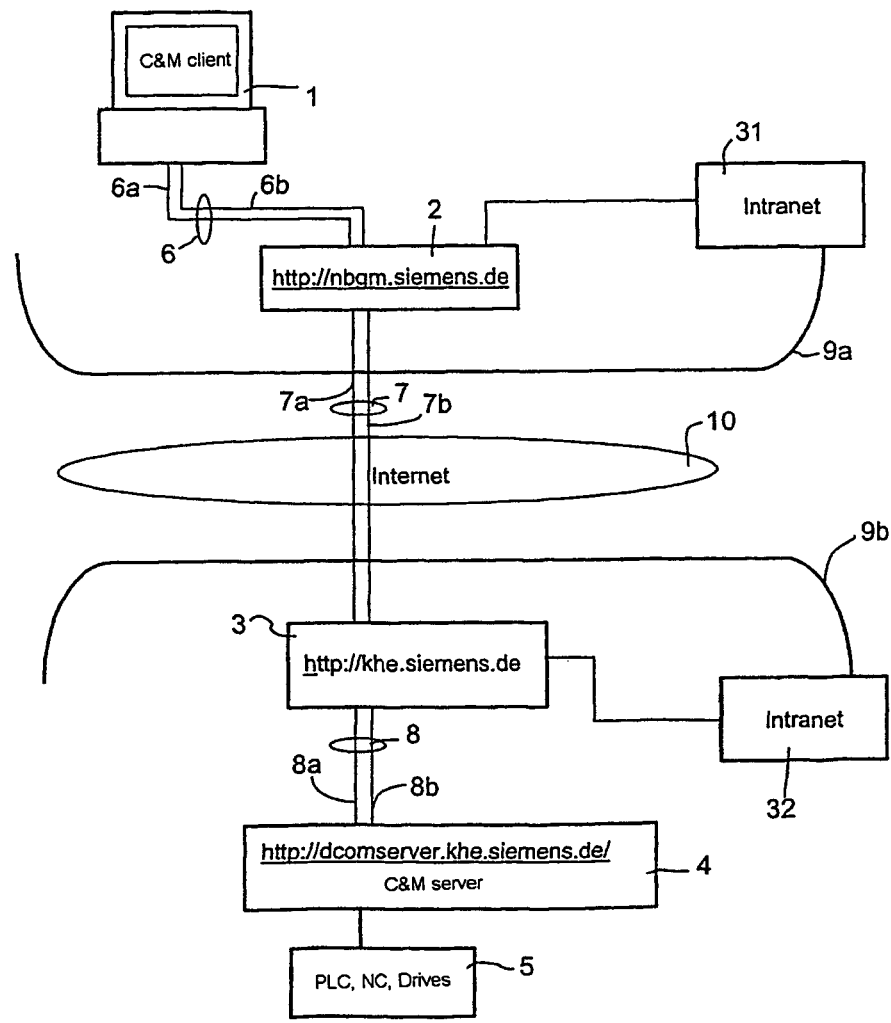
FIG. 1 shows a block diagram of one exemplary embodiment of an automation system with Internet coupling for control and monitoring.

Reference will now be made in detail to the preferred embodiments of the present invention, examples of which are illustrated in the accompanying drawings, wherein like reference numerals refer to like elements throughout.

FIG. 1 shows an exemplary embodiment of a system for controlling and monitoring automation systems 5, which, for example, feature programmable logic controllers (PLCs), numerical controllers (NCs) and/or drives. The system has a control and monitoring system 1 (C&M client), which is connected to a firewall computer 2 via an internal data network 6, e.g. Ethernet. The control and monitoring system 1, which in the following is also referred to as the C&M system 1 by way of abbreviation, has assigned to it a local intranet address, which does not have to be known on the Internet. The firewall of the firewall computer 2 is indicated in FIG. 1 with the help of the line 9a, which encloses the internal communication network 31 (=intranet 31) of the firewall server 2. The worldwide data communication network, the Internet, is identified by the reference 10. The firewall computer 2 can be connected to the Internet 10 by a connection line 7, e.g. ISDN. The automation system 5 can be connected to the Internet via an Internet server 4, which acts as a C&M server 4 for the automation system 5 and which, for example, has the Internet address dcomserver.khe.siemens.de/, by a connection line 8 and in each case a second firewall computer 3. The second firewall 9b encloses the intranet 32 associated with the firewall computer 3. The firewall computer 3 is visible on the Internet 10, for example, under the Internet address khe.siemens.de.

The data connection 6, 7, 8 between the client 1 and the server 4 is shown in FIG. 1 in the form of two partial channels for better representation and clarification of the appropriate transmission direction in the communication between client 1 and server 4 and vice versa. These partial channels include a first transmission channel 6a, 7a, 8a, which symbolizes the communication direction from the client 1 to the server 4 and a second transmission channel 6b, 7b, 8b, which symbolizes the communication direction from the server 4 to the client 1. Physically, the two partial channels shown are a single transmission channel, i.e. the same physical transmission channel is used for a response from the server 4 to an associated request from the client 1 to the server 4.

In the following, by way of example, the setting-up of a bidirectional transmit and receive connection, which is mutually independent with respect to time, between the client 1 and the C&M server 4 via the Internet 10 is to be explained with reference to the setting-up of a connection between the client 1 and the C&M server 4. In addition to this, an asynchronous method is used, which makes it possible for the C&M server 4 to be able to transmit data to the client 1 independently of actions of the client 1, which itself does not have to be visible on the Internet 10, i.e. does not have its own valid Internet address.

In addition to this, the client 1 sends a first query, a so-called request, via the Internet 10 to the C&M server 4 via the first transmission channel 6a, 7a, 8a, to which the C&M server 4 responds with a so-called response via the second transmission channel 6b, 7b, 8b. In order to prevent a transient interruption of the response and thus a break in the data connection 6, 7, 8, the duration of the response is extended to be "infinitely" long. In addition to this, the system is informed, for example, that further data are still to be sent. By this, a permanently open data connection 6, 7, 8 results, via which the C&M server 4 and thus the automation system 5 can asynchronously transmit data to the client 1, and thus to the C&M system 1, at any time and independently of actions of the client 1. In order to keep the data connection 6, 7, 8 permanently open, it is also possible, for example, to transmit apparent data at regular intervals, advantageously every 25-35 sec. from the server 4 to the client 1.

Furthermore, a "normal" communication via the Internet 10 can take place between the client 1 and the C&M server 4 regardless of this permanently open data connection 6, 7, 8, i.e. the client 1 transmits a request to the C&M server 4 via a new transmission channel and the C&M server 4 replies to this request with an appropriate response via this transmission channel. When the data has been transmitted, the new transmission channel is closed once more. In this way, the client 1 as well as the C&M server 4 can bidirectionally transmit and receive data mutually independently with respect to time.

A transport protocol, in particular an Internet transport protocol, is used for controlling the data transmission. Advantageously, the Hypertext Transport Protocol (HTTP) is used as the transport protocol.

Figure 2:
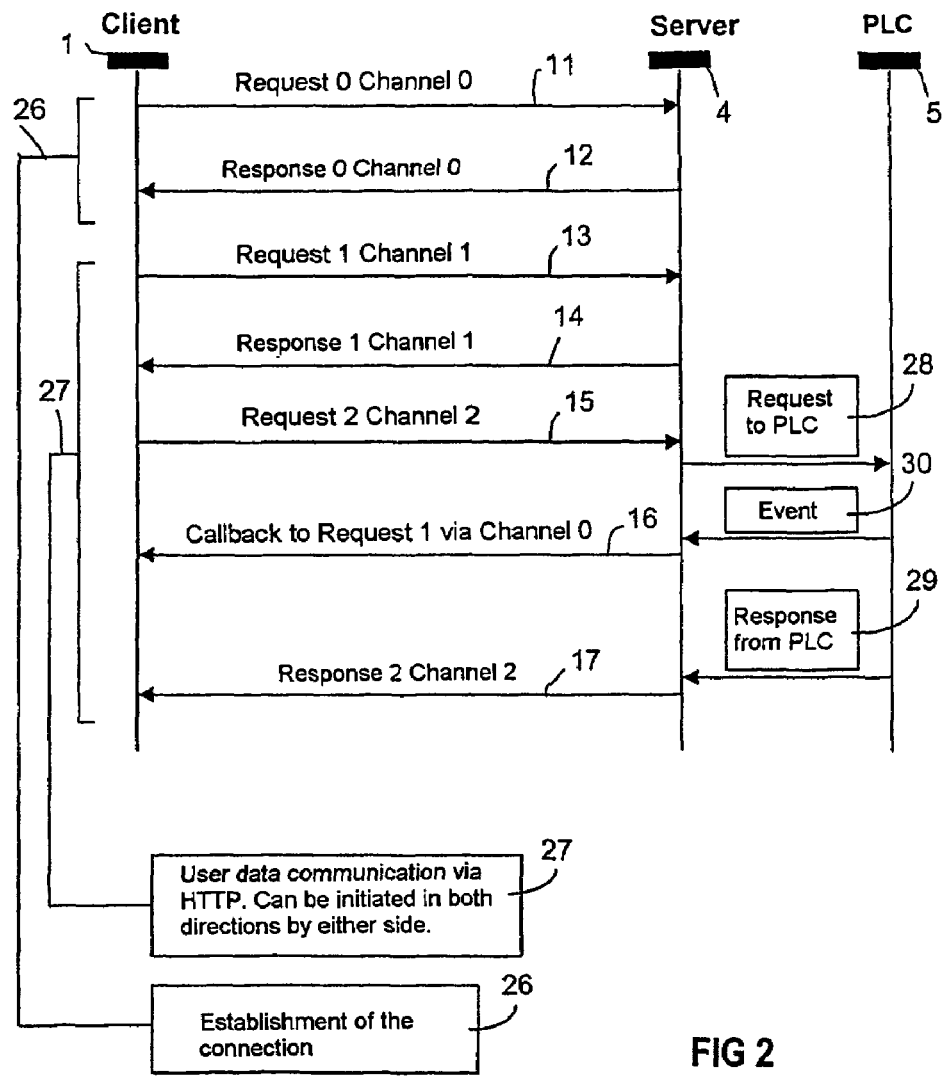
FIG. 2 shows a schematic time-related diagram for possible user data communication between client and automation system.

FIG. 2 shows the time-related process of the establishing 26 of a permanently open data connection 6, 7, 8 between a client 1 and a C&M server 4, to which an automation system 5 which is, for example, referred to as PLC (=programmable logic controller) is connected. The illustration uses the UML notation (unified modeling language). Furthermore, FIG. 2 shows the bidirectional communication, which can be initiated by client 1 and C&M server 4 after establishing the data connection mutually independently with respect to time. The time-related process of establishing the data connection is as follows: the client 1 places a request 11 on the server 4, which replies to this with a response 12, whereby this data connection is not cleared. In addition to this, the client 1 is informed, for example, that further data are still to be sent, as a result of which this data connection is kept permanently open. In order to keep the data connection permanently open, it is also possible, for example, to transmit apparent data at regular intervals, in particular every 25-35 sec., from the server 4 to the client 1 if no user data can be transmitted.

By this, the server 4 as well as the automation system 5 connected to the server 4 can transmit data to the client 1 at any time independently of the client 1. After the response 12 of the server 4, the client 1 sends a new request 13 to the server 4. In addition to this, a new data connection is set up. The server 4 in turn replies with a response 14 (=synchronous behavior). This data connection is closed once more when data transmission is complete. If required, the client 1 transmits a request 15, for example, via the server 4, which is forwarded to the PLC 5 as request 28. The PLC transmits a response 29 back to the server 4, which forwards it to the client 1 with a response 17 (=synchronous behavior). This data connection is likewise closed once more when the data transmission is complete.

Independently of and in parallel with this, the server 4 can send a message to the client 1 via the permanently open data connection 12, e.g. a response to an event 30 in the PLC 5, without the client 1 previously having sent a request (=asynchronous callback 16). This would not be possible with a "normal" HTTP connection. In particular, this asynchronous callback 16 is also possible in time between a request 15 and a not yet initiated response 17.

Overall, this results in a user data communication 27 via the Internet in both directions, which can be initiated from both sides and is mutually independent with respect to time. In this way, it is also possible to use existing communication paths of the Internet in the usual manner as an HMI interface (Human Machine Interface) in the field of automation technology for control and monitoring purposes. By way of example, the Siemens control and monitoring system WinCC may be considered as an advantageous application. The system and method enable DCOM tasks to be transmitted from the client 1 to the Internet server 4. The special feature of this is that the method enables the Internet server 4 to be able to transmit DCOM events to its client 1 without the latter having a "real" address, i.e. an address visible on the Internet. The client 1 therefore does not need to be visible on the Internet. Also, it does not need to have an Internet Information Server (IIS) installed. No additional costs are therefore necessary on the client side, as Internet browsers such as, for example, Internet Explorer from the company Microsoft or Netscape Communicator from the company Netscape are available everywhere. No special solutions are therefore required for an exchange of data between automation system and C&M user, for instance for alarm purposes.

Figure 3A:
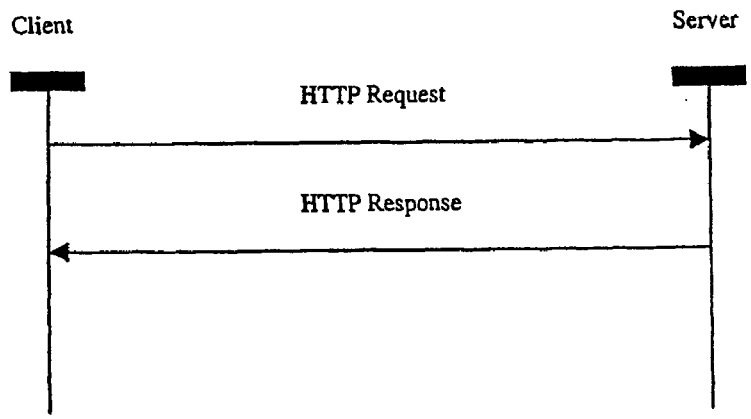
FIG. 3a shows a schematic outline diagram for an HTTP request-response model.

FIG. 3a shows a schematic outline diagram for an HTTP request-response model. After transmitting the HTTP response, the data channel is closed and the server can only transmit data to the client on receipt of a new request (from the client).

Figure 3B:
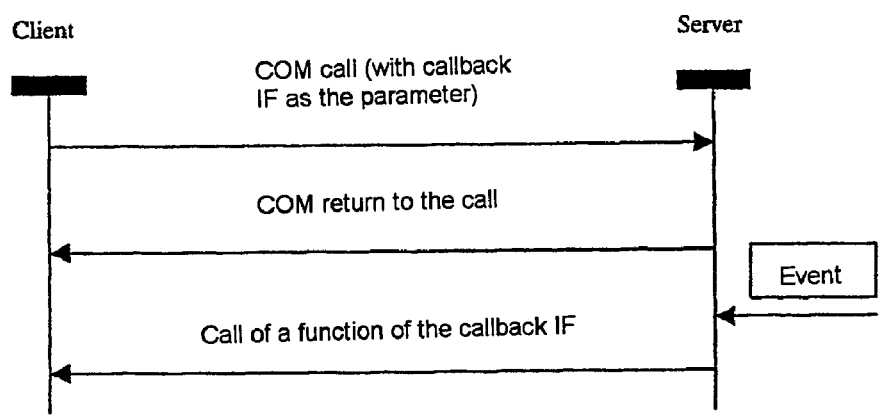
FIG. 3b shows a schematic outline diagram for a COM callback scenario and FIG. 4 shows an outline diagram for two data networks that can be coupled via the Internet.

FIG. 3b shows a schematic outline diagram for a COM callback scenario. COM offers the possibility of transmitting data asynchronously from the COM server to the COM client. This technique is commonly known as callback. This technique is used, for example, in automation in order to report back alarms etc. Overall, this therefore results in a COM automatic marshaller being available for COM communication on the Internet.

Figure 4:
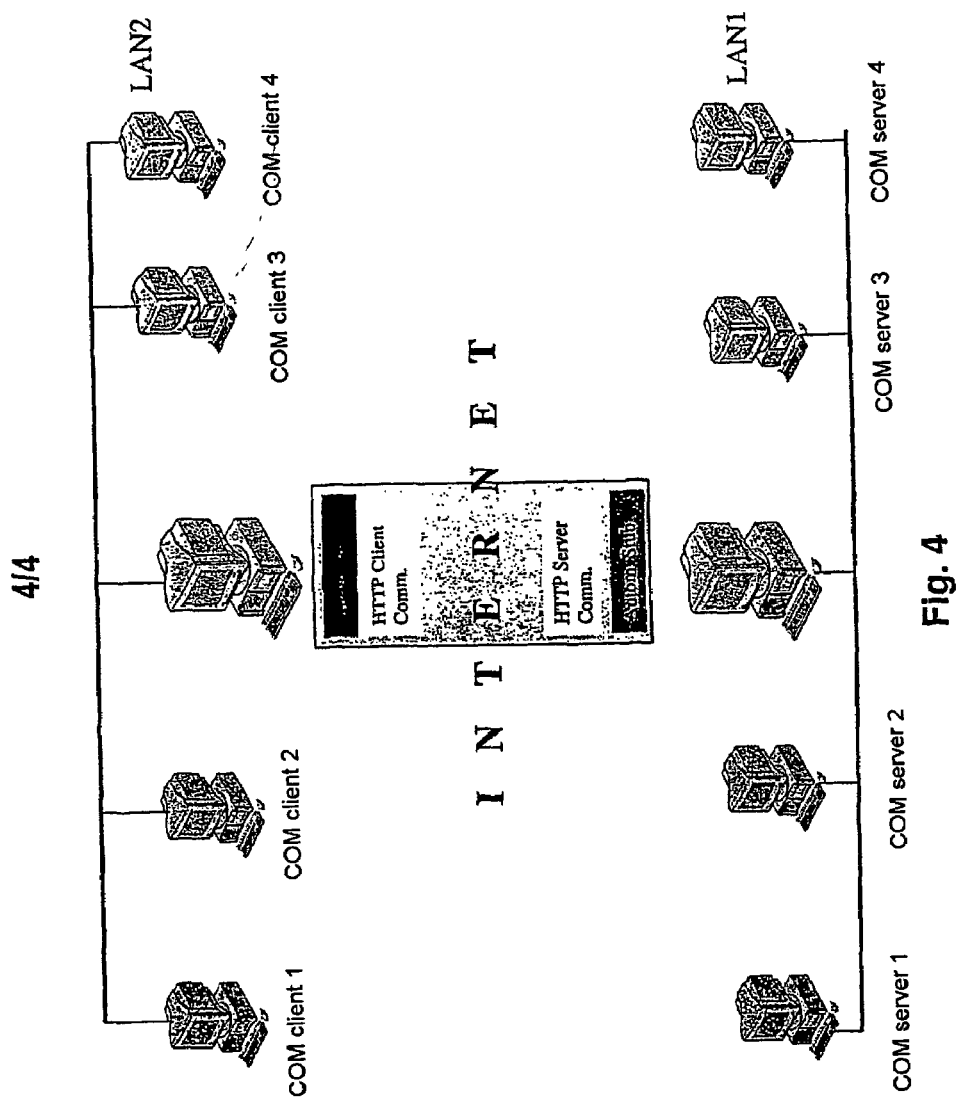

FIG. 4 shows an outline diagram for two data networks that can be coupled via the Internet. An automatic marshaller proxy on the client machine behaves like the COM server to be extended and accepts all calls. These calls are converted by the proxy into a format for "bidirectional communication on the Internet (bi-com for short)" and transmitted to the server in this form. At the same time, the COM clients could run on various machines, which then connect to the automatic marshaller proxy via DCOM in the LAN.

An automatic marshaller stub accepts the data on the server side and, in the case of the "real" COM servers, executes the call. The same method, the via bi-com both directions of data are possible at all times, is used for callbacks. This means that, above the communication layer, the (COM) communication is symmetrical even though it is based on an asymmetrical communications protocol (HTTP).

In summary, the system and method transmit data via data networks, especially the Internet, in particular data for controlling and monitoring an automation system 5. A method or a system is proposed for a bidirectional user data connection, even behind firewalls, via the Internet in both directions, including from a client 1, which is not visible as a server on the Internet, in which a first connection request for setting up a first transmission channel 6a, 7a, 8a is transmitted to a C&M server 4 of an automation system 5 from a first data processing device of a client 1, in particular from a control and monitoring system 1, via a data connection 6, 7, 8, in particular an Internet connection. A response to this takes place via a second transmission channel 6b, 7b, 8b. A usage duration of the data connection 6, 7, 8, which is unlimited in time, is ensured by transmitting apparent data, to maintain the data connection 6, 7, 8, for example, even when user data are not available or by transmitting information to the client 1 which informs the client 1 that a transmission of user data is still intended. This results in a permanently open data connection 6, 7, 8 via which the C&M server 4 and thus the automation system 5 can transmit data asynchronously to the client 1 and thus to the C&M system 1 at any time and independently of actions of the client 1.

The invention has been described in detail with particular reference to preferred embodiments thereof and examples, but it will be understood that variations and modifications can be effected within the spirit and scope of the invention.

The invention claimed is:

1. A method for transmitting data via a data network, comprising:
   transmitting a first connection request for setting up at least one first transmission channel, the first connection request being transmitted to a server from a client via a data connection; and
   maintaining at least one data connection permanently open, for the transmission of data from the server to the client, independently of actions of the client, the data connection being maintained via a Component Object Modeling automatic marshaller, provided between the client and the server,
   wherein, in order to maintain the data connection and permanently allow quantities of data up to a defined size to be transmitted from the server to the client, the server transmits a requirement for a new connection request to the client before the quantity of data reaches the defined size and, after this, the client transmits a new connection request to the server for setting up at least one new transmission channel.

2. The method as claimed in claim 1, wherein the automatic marshaller interprets a call to be carried out and transmits the data relevant to the call to the server, which then carries out the actual call.

3. The method as claimed in claim 1, wherein to permanently maintain the data connection between server and client, dummy data is transmitted when user data is not available.

4. The method as claimed in claim 3, wherein the dummy data is transmitted from the server to the client.

5. The method as claimed in claim 3, wherein when user data is not available, dummy data is transmitted from the server to the client every 25-35 sec.

6. The method as claimed in claim 1, wherein, in order to permanently maintain the data connection, the server transmits information to the client, which informs the client that a transmission of data is intended.

7. The method as claimed in claim 1, wherein the defined size of data to be transmitted is 15-25 MB.

8. The method as claimed in claim 1, wherein an Internet transport protocol is provided to control data transmission.

9. The method as claimed in claim 8, wherein the Internet transport protocol is a Hypertext Transport Protocol.

10. The method as claimed in claim 1, further comprising controlling and monitoring an automation system via the data network.

11. The method as claimed in claim 10, wherein
    the client has a control and monitoring system,
    the control and monitoring system initiates the provision of at least one transmission channel as a distributed object, and
    a connection to the automation system is set up via a Distributed Component Object Modeling server.

12. The method as claimed in claim 1, wherein the client is not visible on the data network.

13. The method as claimed in claim 1, wherein the client does not have an Internet Information Server installed.

14. A method as claimed in claim 1, wherein the data network is an asynchronous data network.

15. A system for transmitting data a data network, comprising:
    a data processing device of a client, the data processing device being connected to a data network to establish a data connection to a server, the data connection being in the form of a first transmission channel;
    a data connection maintenance unit to permanently maintain a data connection to the client for the transmission of data from the server to the client at any time, independently of actions of the client; and
    a Component Object Modeling automatic marshaller, provided between the client and the server to maintain the data connection, wherein
    the data connection maintenance unit enables data up to a defined size to be transmitted from the server to the client,
    the data connection maintenance unit transmits a request for a new connection demand to the client before the defined size of data has been reached, and
    in response to the request, the client transmits a new demand for a connection to establish at least one new transmission channel to the server.

16. The method as claimed in claim 15, wherein the automatic marshaller interprets a call to be carried out and transmits the data relevant to the call to the server, which then carries out the actual call.

17. The system as claimed in claim 15, wherein the data connection maintenance unit is provided between the server and the client and has a transmission unit to transmit dummy data when user data is not available.

18. The system as claimed in claim 15, wherein the data connection maintenance unit transmits information from the server to the client, which informs the client that a transmission of data is intended.

19. The system as claimed in claim 15, wherein the system uses an Internet transport protocol to control data transmission.

20. The system as claimed in claim 19, wherein the Internet transport protocol is a Hypertext Transport Protocol.

21. The system as claimed in claim 15, further comprising a control and monitoring system to control and monitor an automation system via the data network.

22. The system as claimed in claim 21, wherein the control and monitoring system is provided at the client, the control and monitoring system initiates the provision of at least one transmission channel as a distributed object, and a connection to the automation system is set up via a Distributed Component Object Modeling server.

* * * * *